(12) United States Patent
Levell et al.

(10) Patent No.: US 7,832,521 B2
(45) Date of Patent: Nov. 16, 2010

(54) AXLE ASSEMBLY AND VEHICLE

(75) Inventors: Paul Levell, Wrexham (GB); Simon James Peter Evans, Oswestry (GB); Timothy Boothroyd, Wrexham (GB)

(73) Assignee: J.C. Bamford Excavators Limited, Uttoxter (GB)

( * ) Notice: Subject to any disclaimer, the term of this patent is extended or adjusted under 35 U.S.C. 154(b) by 88 days.

(21) Appl. No.: 11/923,771

(22) Filed: Oct. 25, 2007

(65) Prior Publication Data

US 2008/0128194 A1 Jun. 5, 2008

(30) Foreign Application Priority Data

Oct. 25, 2006 (GB) .................................. 0621238.5

(51) Int. Cl.
*B60K 17/06* (2006.01)
(52) U.S. Cl. ...................................................... 180/364
(58) Field of Classification Search ................. 180/364, 180/365, 266, 369, 371, 372, 253, 411, 414, 180/6.24, 6.3, 234; 280/761
See application file for complete search history.

(56) References Cited

U.S. PATENT DOCUMENTS

| 1,172,866 | A | | 2/1916 | Blevins |
| 3,315,759 | A | | 4/1967 | Bohlen |
| 3,603,422 | A | * | 9/1971 | Cordiano ..................... 180/359 |
| 5,020,627 | A | * | 6/1991 | Wittke ......................... 180/234 |
| 5,699,873 | A | * | 12/1997 | Moriya et al. ................. 180/402 |
| 7,255,194 | B2 | * | 8/2007 | Lim et al. ..................... 180/411 |
| 2006/0027411 | A1 | * | 2/2006 | Bordini ....................... 180/253 |

FOREIGN PATENT DOCUMENTS

| CH | 99432 | 6/1923 |
| EP | 0 493 206 | 7/1992 |
| FR | 1.019.007 | 1/1953 |
| GB | 803 713 | 10/1958 |
| GB | 2291148 | 1/1996 |
| GB | 2308344 | 6/1997 |
| JP | 10 230756 | 9/1998 |
| WO | WO 2006/079418 | 8/2006 |

OTHER PUBLICATIONS

European Search Report, Corresponding to European Application No. EP 07 11 9288, Completed Dec. 17, 2007.
UK Search Report, Corresponding to UK application No. GB0621238.5, Completed on Jan. 2, 2007.

* cited by examiner

*Primary Examiner*—Faye M. Fleming
(74) *Attorney, Agent, or Firm*—Greenlee, Winner and Sullivan, P.C.

(57) ABSTRACT

An axle assembly for a vehicle, the axle assembly comprising a differential gear having an input for connection to a drive shaft, and a first wheel hub to support a first wheel and a second wheel hub to support a second wheel, the first wheel hub and the second wheel hub being drivingly connected to the differential gear, wherein the first wheel hub is drivingly connected to the differential gear via a reverser mechanism, the reverser mechanism having a first operating mode where the first wheel hub is driven in the same direction as the second wheel hub and a second operating mode where the first wheel hub is driven in the opposite direction to the second wheel hub.

13 Claims, 4 Drawing Sheets

AXLE ASSEMBLY AND VEHICLE

BACKGROUND TO INVENTION

This invention relates to an axle assembly for a vehicle and a vehicle comprising an axle assembly via particularly but not exclusively a material handling vehicle.

In conventional vehicles, steering is achieved by pivoting one set of wheels, usually the forward set of wheels. In particular applications, however, such as for material handling vehicles, it is desirable to provide a vehicle with different steering characteristics, for example to allow a tighter turning circle. Skid steer vehicles operate by driving wheels on opposite sides of the vehicle at different speeds or in different directions, to provide a very tight turning circle or even spin on the spot. Where the wheels are provided with tyres, however, this result and "scrubbing" between the tyres and the surface on which the vehicle is travelling and leads to tyre wear, and skid steering is generally regarded as most appropriate for the vehicles with short wheel bases. Where a vehicle has a longer wheel base, it is known to provide steering on both axles, such that the front and rear wheels can be controlled either such that the front and rear wheels are pointing in opposite directions to provide a tighter turning circle, or may be rotated in the same direction to provide so called "crab" steering which allows the vehicle to move diagonally.

To provide longer-wheel based vehicles with spin turn capability, it is known from vehicles such as the Jeep Hurricane to provide a so called "spin turn" capability wherein each wheel is pivoted about a generally vertical axis such that each wheel extends tangentially or as close as tangentially as possible to a common circle. By driving one or more of the wheels, the vehicle can then spin in position. Such a mechanical configuration is complicated to provide as the wheels of the end of each axle must revolve in opposite directions and drive must be transmitted to the wheels. The known arrangement is heavy, and mechanically complicated.

SUMMARY OF THE INVENTION

According to a first aspect of the invention, we provide an axle assembly for a vehicle, the axle assembly comprising a differential gear having an input for connection to a drive shaft, and a first wheel hub to support a first wheel and a second wheel hub to support a second wheel, the first wheel hub and the second wheel hub being drivingly connected to the differential gear, the first wheel hub may be drivingly connected to the differential gear via a reverser mechanism, the reverser mechanism having a first operating mode where the first wheel hub may be driven in the same direction as the second wheel hub and a second operating mode where the first wheel hub is driven in the opposite direction to the second wheel hub.

The reverser mechanism may comprise an epicyclic gear assembly.

The reverser mechanism may be connected to the differential gear by a first part-shaft and to the first wheel hub by a second part shaft.

The first part shaft and the second part shaft may be coaxial.

The reverser mechanism may comprise a first sun gear connected to the first part shaft and a second sun gear connected to the second part shaft.

The reverser mechanism may comprise a first planet gear in mesh with the first sun gear and a second planet gear in mesh with the second sun gear, the first planet gear and second planet gear being drivingly connected.

A planet carrier may support the first planet gear and second planet gear.

In the first operating mode the first sun gear may be fixed relative to the planet carrier.

In the second operating mode the planet carrier may be held fixed relative to a case part of the assembly.

The assembly may comprise a support part, the first wheel hub and second wheel hub being pivotally mounted to the support part.

The assembly may comprise a first steering actuator operable to move the first wheel hub and a second steering actuator to move the second wheel hub.

The assembly may comprise a first sensor to detect the position of the first wheel hub and a second sensor to detect the position of the second wheel hub.

According to a second aspect of the invention, we provide a vehicle comprising an axle assembly, an engine drivingly connected to a transmission, the transmission being connected to the differential gear and a controller, the vehicle may comprise a first wheel and a second wheel connected to the first wheel hub and the second wheel hub, a second axle pivotally supporting a third wheel and a fourth wheel, a third steering actuator operable to move the third wheel and a fourth steering actuator operable to move the fourth wheel.

The vehicle may further comprise a steering controller, the steering controller being operable to receive a spin steer request, control the first, second, third and fourth steering actuators to place the wheels in a spin steer configuration, and place the reverser mechanism in the second operating mode.

The steering controller may be operable to detect the vehicle speed and only control the first, second, third and fourth steering actuators to place the wheels in a spin steer configuration if the vehicle is stationary.

The vehicle may comprise a plurality of detectors operable to detect the positions of the wheels wherein the controller receives wheel position information from the detectors.

The second axle may comprise an axle assembly according to the third aspect of the invention, the transmission may be connected to the differential gear of the second axle assembly.

BRIEF DESCRIPTION OF THE DRAWINGS

The invention will now be described by way of example only with reference to the accompanying drawings, wherein.

DESCRIPTION OF THE PREFERRED EMBODIMENT

Figure 1:
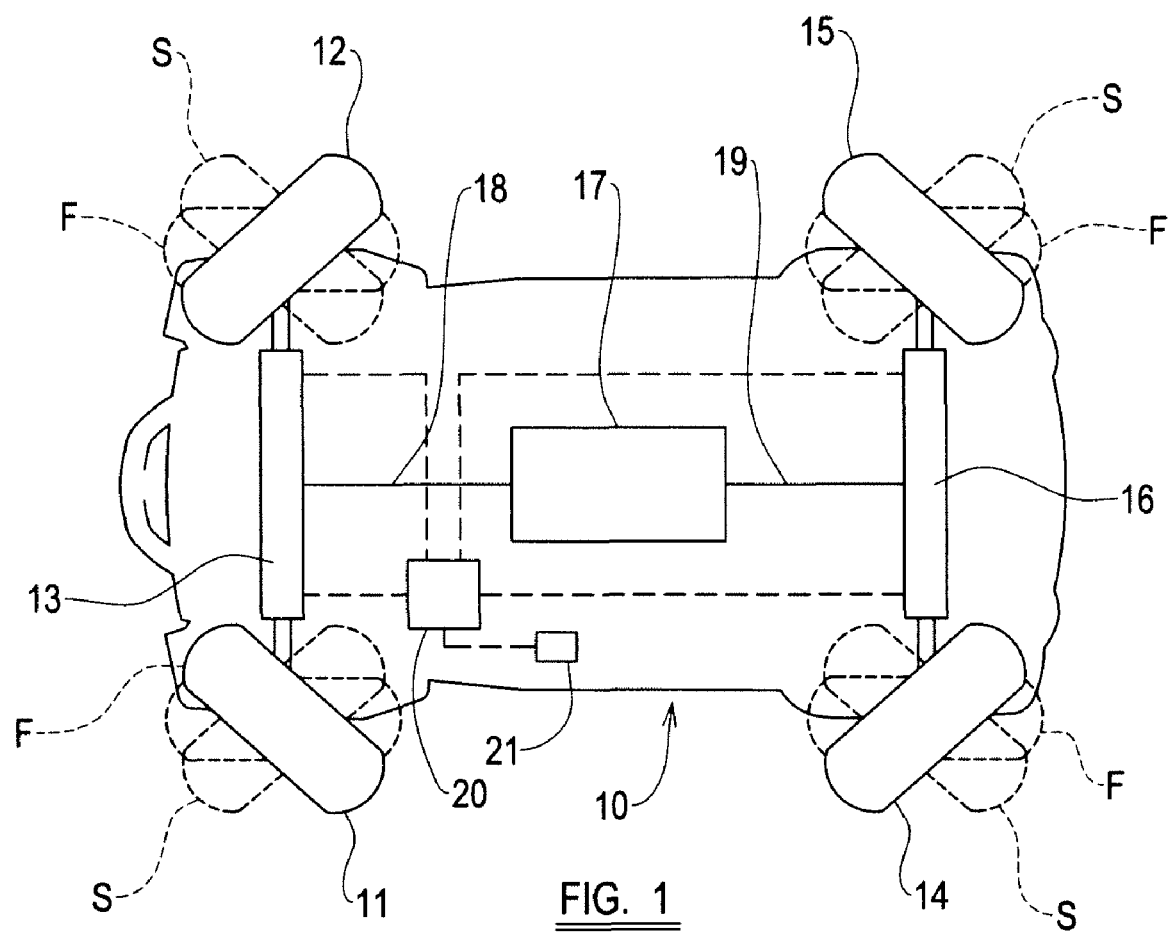
FIG. 1 is a plan view of a vehicle embodying the present invention.

A vehicle embodying the present invention is generally shown at 10 in FIG. 1. The vehicle 10 is provided with a first wheel 11 and second wheel 12 supported on a first, forward, axle assembly 13. The vehicle similarly has a third wheel 14 and fourth wheel 15 supported on a second, rearward axle assembly 16. An engine and transmission, generally illustrated at 17, is connected to the first axle assembly 13 and second axle assembly 16 through shafts 18, 19 respectively to provide drive through the axle assemblies 13, 16 to the wheels 11, 12, 14, 15. A steering controller is provided generally shown at 20 operable to detect the positioning of the wheels 11, 12, 14, 15 and control the angle of the wheel 11, 12, 14, 15 as discussed in more detail below. In FIG. 1, the wheels 11, 12, 14, 15 are shown in solid outlined in their spin steer position where the wheels are pivoted relative to the axle assemblies 13, 16 to lie approximately tangentially to the circle of spin of the vehicle. The wheels are also pivotal between a forward position F shown in broken outline and a conventionally pivoted position shown in broken outline S to permit of conventional steering, whether crab steer or all-wheel steering.

Figure 2:
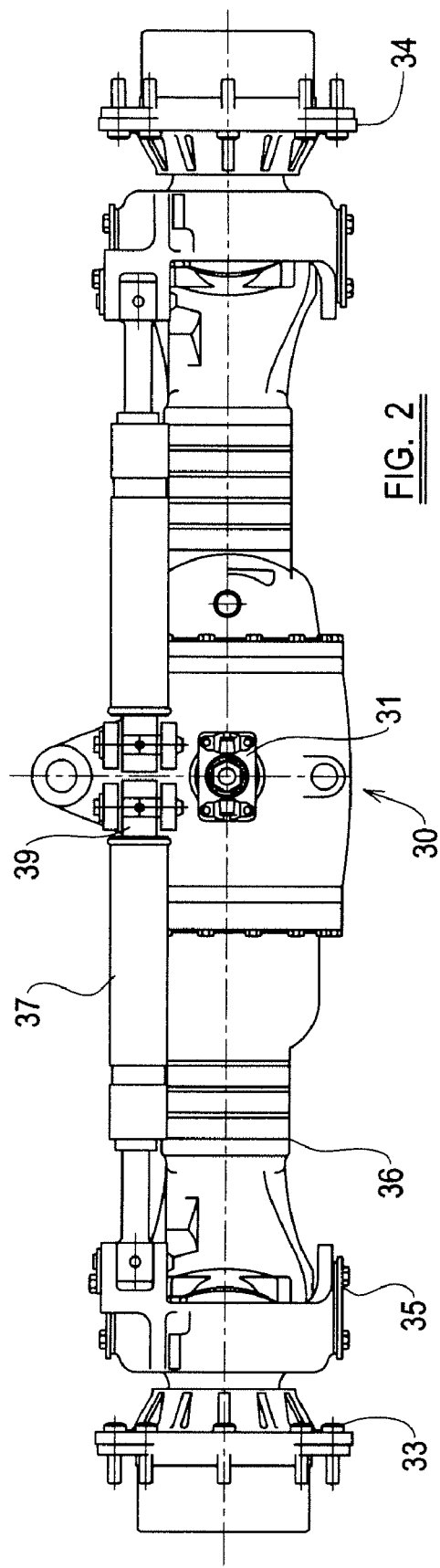
FIG. 2 is a side view of an axle assembly embodying the present invention.
Figure 3:
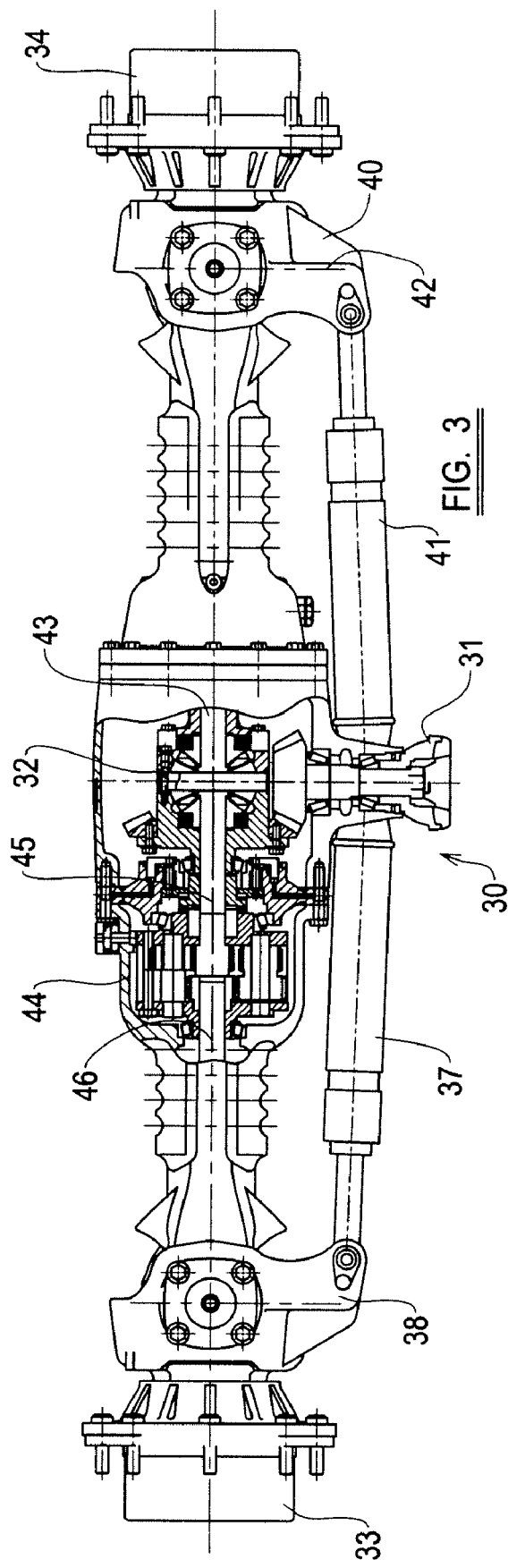
FIG. 3 is a plan view, partly cut away, of the axle assembly of FIG. 2.

The axle assemblies are shown in more detail in FIGS. 2 and 3. Each of the front axle assembly 13 and rearward axle assembly 16 comprises an axle assembly generally illustrated at 30 in FIGS. 2 and 3. The driving assembly 31 is drivingly connected to a differential gear assembly 32 to supply power to the wheels supported on the axle assembly 30 as required in known manner. To support the wheels on the axle assembly 30, the axle assembly 30 is provided with a first wheel hub 33 and a second wheel hub 34 drivingly connected to the differential gear 32. The first wheel hub 33 is supported on a first wheel hub support 35 which is pivotally supported on a body 36 of the axle assembly 30 and is pivotally movable relative thereto by an actuator 37. In this example, the actuator 37 is connected between an arm 38 of the first wheel hub support and a bracket 39 connected to the body 36 and located above the driving connection 31. The second wheel hub 34 is similarly supported on a second wheel hub support 40 pivotally mounted on the body 36, and movable relative thereto by an actuator 41 connected between an arm 42 of the second wheel hub support 40 and the bracket 39. In the present example, the actuators 37, 41 comprise hydraulic actuators controllable by a supply of hydraulic fluid thereto, but it will be apparent that these may be pneumatic electrical or other actuators as desired.

To conduct drive from the differential gear 32 to the respective wheel hubs 33, 34, and appropriate connections are provided. The second wheel hub 34 is simply connected to the differential gear 32 by an appropriate shaft 43. However, it will be apparent that when the wheels are in the spin steer configuration of FIG. 1 and the vehicle is rotatable on the spot, the wheels 11, 14 at one end of each axle 13, 16 will be rotating in a different sense to the wheel 12, 15 supported at the other end of the axle assembly 13, 16. To permit rotation of the wheels in opposite senses, the axle assembly 13 further comprises a reverser mechanism generally shown at 44. The reverse gear 44 is connected to the differential gear 32 by a first part shaft 45 and to the first wheel hub 33 by a second part shaft 46.

Figure 4:
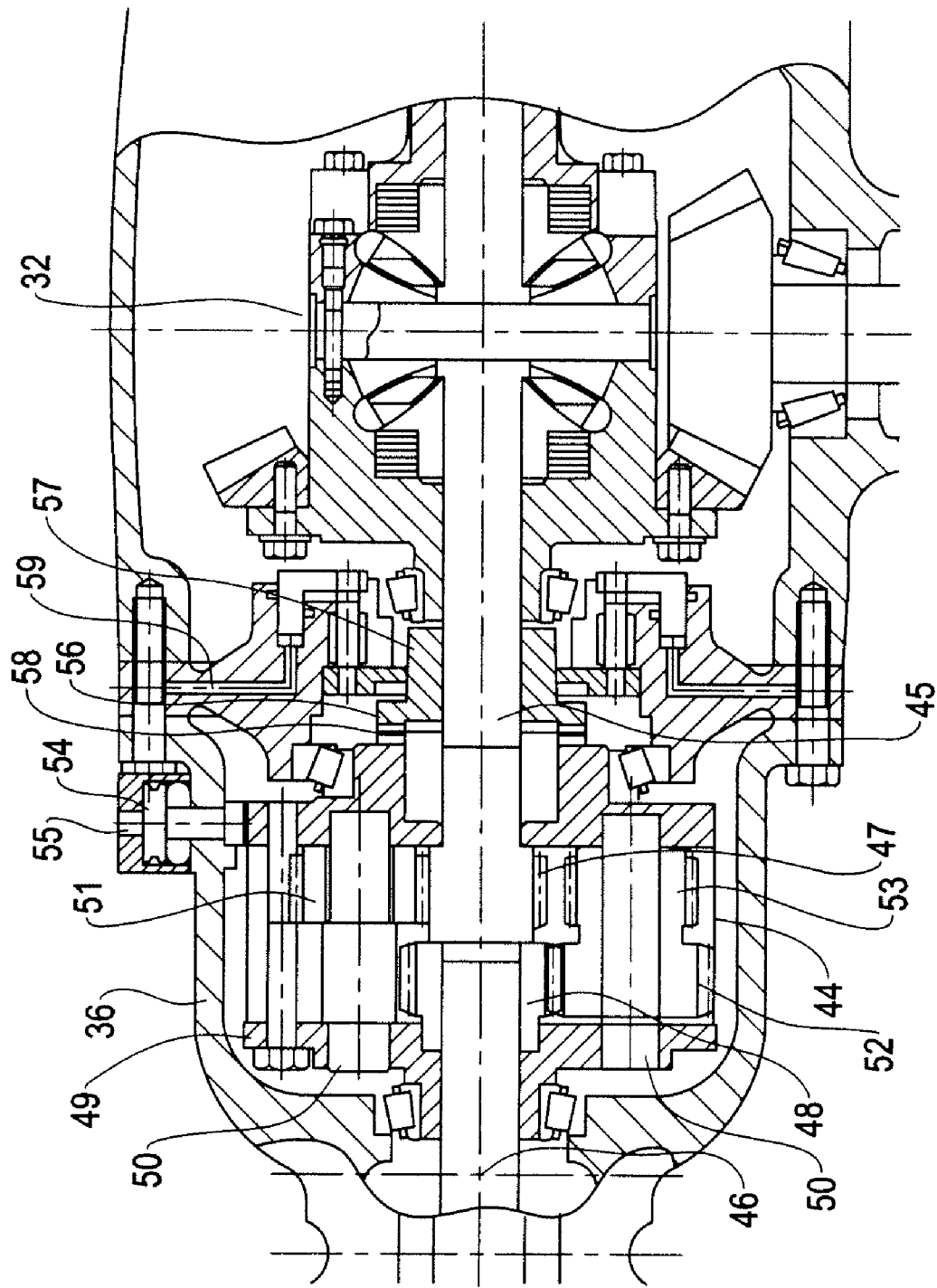
FIG. 4 is a view in greater detail of part of the view of FIG. 3.
Figure 5:
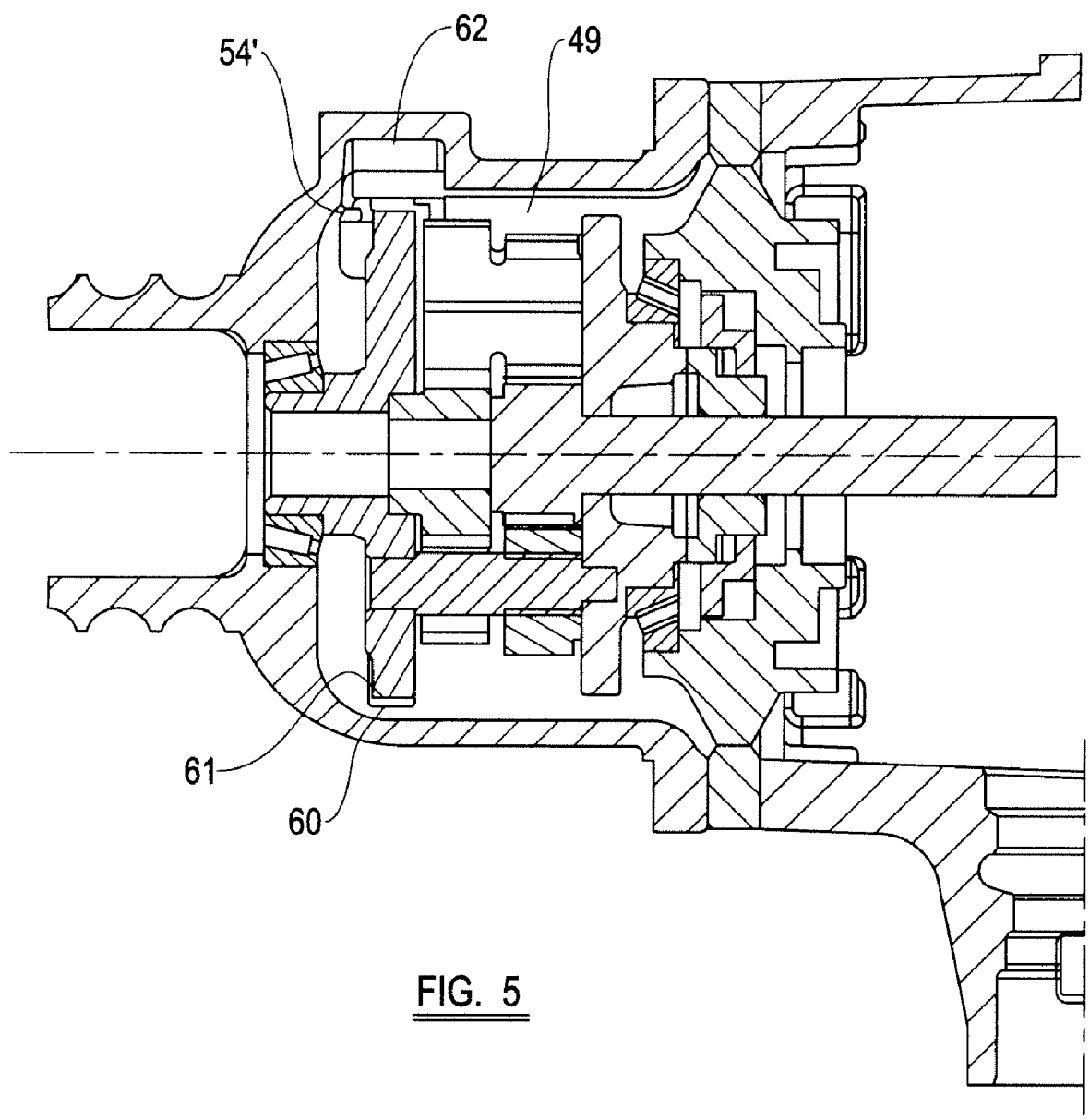
FIG. 5 is a view similar to FIG. 4 showing an alternative embodiment of the invention.

The reverser gear 44 will now be described in more detail with reference to FIG. 4. As illustrated in FIG. 4, the reverser mechanism 44 comprises an epicyclic gear mechanism. A first sun gear 47 is connected to the first part shaft 45 and a second sun gear 48 connected to the second part shaft 46. A planet carrier is shown at 49 having a plurality of planet support pins 50 on which the planetary gears are supported as follows. A first planet gear 51 is supported by the planet carrier 49 in mesh with the first sun gear 47. The planet carrier 49 similarly supports a second planet gear 52 in mesh with the second sun gear 48. The second planet gear is drivingly connected to a intermediate gear 53, in this example integrally provided therewith and supported on the same pin 50. The intermediate gear 53 is in mesh with a first planet gear 51 and consequently provides a driving connection between the second planet gear 52 and first planet gear 51. In the present example, there are three first planet gears 51 and three second planet gears 52, each of the first planet gears 51 being in mesh with a corresponding intermediate gear 53 to drive a corresponding first planet gear 52, but any other number and configuration of planet gears may be provided as appropriate. A planet carrier lock is shown at 54, in the present example comprising a piston responsive to the supply of pressurised fluid through inlet 55 to lock the planet carrier 49 relative to the axle assembly body 36. A clutch mechanism 56 is also provided operable to lock the planet carrier 49 relative to the part shaft 45. In the present example the clutch 56 comprises a clutch element 57 splined to the first part shaft 45 which engages with teeth 58 provided with the planet carrier 49. The clutch 56 is operable by supply of fluid pressure through inlet 55.

The reverser mechanism is thus operable to select one of a first operating mode and a second operating mode by operating the lock 54 or clutch 56 as follows. In a first operating mode, no pressure is supplied on inlet 55 so the lock 54 is released. Pressure is supplied on line 59 to engage the clutch 56, such that the planet carrier 49 is fixedly engaged with the first part shaft 45 and hence the first sun gear 47 cannot rotate relative to the planet carrier 49. In this locked configuration, no relative rotation of the sun gears 47, 48 and planet gears 51, 52 is possible, and so the reverser assembly is generally locked. Accordingly, the reverser mechanism revolves as a unit and drive is passed from the first part shaft 45 to the second part shaft 46 such that the first and second part shafts 45, 46 rotate at the same speed and the same sense. In a second operating mode, the clutch 56 is released, and the lock 54 is operated by a supply of fluid pressure on inlet 55. The planet carrier 49 is hence locked relative to the body 36 while the part shaft 45 and hence the first sun gear 47 are able to rotate relative to the planet carrier 49. The sun gears thus rotates relative to the planet carrier 49, causing the first planet gears 51 and hence the second planet gears 52 to rotate, causing the second sun gear 48 to rotate in an opposite sense to the first sun gear 47, and hence causing the second part shaft 46 to rotate in an opposite sense to the first part shaft 45. By choosing the dimensions of the sun gears 47, 48 and planet gears 51, 52 and intermediate gears 53 accordingly, the second part shaft 46 is driven at the same rotational speed as the first part shaft 45 but in an opposite sense. Accordingly, in the second operating mode, the wheels supported on the axle assembly are both driven at the same speed but in opposite directions.

In this example, the actuators 37, 41, lock 54 and clutch 56 of each axle assembly 13, 16 are under the control of a controller 20. The controller 20 is also preferably operable to detect the angle of each wheel 11, 12, 14, 15 by means of appropriate sensors (not shown). Accordingly, when spin steering is requested, for example by operation of an operator control 21, the controller 20 will first check that the vehicle is stationary. The controller 20 will then operate the actuators 37, 41 of each axle assembly 13, 16 until the wheel reaches the positions shown in solid outline in FIG. 1. The controller 20 preferably operates the actuators 37, 41 until the wheel positions received from the sensors indicates that the wheels are in the correct position for spin turning. The controller 20 then operates the reverser mechanism of each axle assembly 13, 16 to release the clutch 56 and engage the lock 54 as discussed above. The operator of the vehicle 10 may then control the engine and/or transmission 17 to supply drive to the wheels 11, 12, 14, 15, or alternatively the controller 20 may control the engine and/or transmission 17 to provide spin turn at a desired rate as appropriate. Because the wheels 11, 12, 14, 15 at opposite ends of each axle are driven in the opposite direction at the same speed, the vehicle will thus generally spin on the spot with little tyre wear or scrubbing under four wheel drive.

When the spin turn is no longer required, the actuator 20 can operate the actuators 37, 41 of each axle assembly 13, 16 to return each wheel to the forward orientation shown at F in FIG. 1, and release the lock 54 and engage the clutch 56 of the reverse mechanism 44 such that the wheels 11, 12, 14, 15 of each axle assembly 13, 16 rotate in the same direction at the same speed.

Although in this example, the vehicle 10 is provided with two axle assemblies 13, 16 each of which corresponds the axle assembly 30, it will be apparent that one of the axle assemblies could be undriven, in which case it will only be necessary to be able to rotate the wheels of the undriven axle to the spin steer position.

The reverser mechanism described herein is particularly advantageous in that the part shafts 45, 46 are coaxial and the overall envelope of the reverser mechanism 44 is such that it does not require an excessive change to the envelope of the axle assembly 30, thus permitting the axle assembly 30 to be accommodated within a standard area of a vehicle. It will be apparent that any other appropriate reverser mechanism may be provided.

It will be apparent that the reverser mechanism may be provided in other forms or configurations as desired. An alternative embodiment is shown in FIG. 4 comprising an alternative lock mechanism 54' in place of the lock mechanism 54 of FIGS. 3 and 4. Instead of a piston acting on the planet carrier 49, the lock 54' comprises a flexible brake band 60 which engages a radially outer surface 61 of the planet carrier 49. In this embodiment, the radially outer surface 61 is provided on an end part 62 of the planet carrier 49 which is closer to the first wheel hub 33. The lock 54' comprises a piston 63 which is extendible to tighten the brake band 60 around the end part 62 to provide frictional engagement between the brake band 60 and the radially outer surface 61, thus holding the planet carrier 49 relative to the body 36. An appropriate lock 54, 54' may be selected according to the braking or holding force required to lock the planet carrier 49.

In the present specification "comprise" means "includes" and "comprising" means "including".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A vehicle comprising an axle assembly, the axle assembly comprising a differential gear having an input for connection to a drive shaft, and a first wheel hub to support a first wheel and a second wheel hub to support a second wheel,
    the first wheel hub and the second wheel hub being drivingly connected to the differential gear,
    wherein the first wheel hub is drivingly connected to the differential gear via a reverser mechanism,
    the reverser mechanism having a first operating mode where the first wheel hub is driven in the same direction as the second wheel hub and a second operating mode where the first wheel hub is driven in the opposite direction to the second wheel hub;
    an engine drivingly connected to a transmission, the transmission being connected to the differential gear;
    a first wheel and a second wheel connected to the first wheel hub and the second wheel hub, respectively;
    a first steering actuator operable to move the first wheel;
    a second steering actuator operable to move the second wheel;
    a second axle pivotally supporting a third wheel and a fourth wheel;
    a third steering actuator operable to move the third wheel;
    a fourth steering actuator operable to move the fourth wheel; and
    a steering controller operable to receive a spin steer request, control the first, second, third and fourth steering actuators to place the wheels in a spin steer configuration, and place the reverser mechanism in the second operating mode.

2. A vehicle according to claim 1 wherein the reverser mechanism comprises an epicyclical gear assembly.

3. A vehicle according to claim 2 wherein the reverser mechanism is connected to the differential gear by a first part shaft and to the first wheel hub by a second part shaft.

4. A vehicle according to claim 3 wherein the first part shaft and the second part shaft are coaxial.

5. A vehicle according to claim 3 wherein the reverser mechanism comprises a first sun gear connected to the first part shaft and a second sun gear connected to the second part shaft.

6. A vehicle according to claim 5 wherein the reverser mechanism comprises a first planet gear in mesh with the first sun gear and a second planet gear in mesh with the second sun gear, the first planet gear and second planet gear being drivingly connected.

7. A vehicle according to claim 6 comprising a planet carrier supporting the first planet gear and second planet gear.

8. A vehicle according to claim 7 wherein in the first operating mode the first sun gear is fixed relative to the planet carrier.

9. A vehicle according to claim 7 wherein in the second operating mode the planet carrier is held fixed relative to a case part of the assembly.

10. A vehicle according to claim 1 wherein the assembly comprises a first and a second support parts, the first wheel hub and second wheel hub being pivotally mounted to the first and second support parts, respectively.

11. A vehicle according to claim 1 wherein the steering controller is operable to detect the vehicle speed and only control the first, second, third and fourth steering actuators to place the wheels in a spin steer configuration if the vehicle is stationary.

12. A vehicle according to claim 1 comprising a plurality of detectors operable to detect the positions of the wheels wherein the steering controller receives wheel position information from the detectors.

13. A vehicle according to claim 1 wherein the second axle comprises a second axle assembly comprising;
    a differential gear having an input for connection to a drive shaft, and
    a third wheel hub to support the third wheel and a fourth wheel hub to support the fourth wheel,
    the third wheel hub and the fourth wheel hub being drivingly connected to the differential gear,
    wherein the third wheel hub is drivingly connected to the differential gear via a reverser mechanism,
    the reverser mechanism having a first operating mode where the third wheel hub is driven in the same direction as the fourth wheel hub and a second operating mode where the third wheel hub is driven in the opposite direction to the fourth wheel hub,
    and wherein the transmission is connected to the differential gear of the second axle assembly.

* * * * *